(12) United States Patent
Specht et al.

(10) Patent No.: US 8,764,087 B2
(45) Date of Patent: Jul. 1, 2014

(54) DEVICE FOR RETAINING A FUNCTIONAL PART, IN PARTICULAR A ROOF HANDLE, IN A VEHICLE

(75) Inventors: Bodo Specht, Braunschweig (DE); Hermann Tietge, Gifhorn (DE); Rico Voigt, Wolfsburg (DE); Gerhard Reder, Moensheim (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 13/493,171

(22) Filed: Jun. 11, 2012

(65) Prior Publication Data

US 2012/0280095 A1    Nov. 8, 2012

Related U.S. Application Data

(63) Continuation of application No. PCT/EP2010/007474, filed on Dec. 9, 2010.

(30) Foreign Application Priority Data

Dec. 10, 2009  (DE) .......................... 10 2009 057 833

(51) Int. Cl.
*B60N 3/02*   (2006.01)
(52) U.S. Cl.
USPC ...................................................... 296/1.02
(58) Field of Classification Search
CPC ............ B60N 3/026; B60N 3/02; B60N 3/023
USPC ........................................... 296/1.02, 187.05
See application file for complete search history.

(56) References Cited

U.S. PATENT DOCUMENTS

| | | | |
|---|---|---|---|
| 6,722,729 B2 * | 4/2004 | Yoshida et al. | 296/187.09 |
| 6,869,119 B2 * | 3/2005 | Ito et al. | 296/1.02 |
| 2004/0140682 A1 | 7/2004 | Ito et al. | |

FOREIGN PATENT DOCUMENTS

| | | |
|---|---|---|
| DE | 295 17 468 U1 | 2/1996 |
| DE | 100 22 111 A1 | 11/2001 |
| DE | 202 09 141 U1 | 11/2003 |
| DE | 103 58 118 A1 | 7/2005 |
| DE | 10 2005 033 080 A1 | 2/2007 |
| DE | 10 2005 050 259 A1 | 4/2007 |
| DE | 10 2005 053 647 A1 | 5/2007 |
| DE | 10 2007 043 116 A1 | 3/2009 |
| DE | 10 2008 025 740 A1 | 12/2009 |

* cited by examiner

*Primary Examiner* — Joseph Pape
(74) *Attorney, Agent, or Firm* — Muncy, Geissler, Olds & Lowe, P.C.

(57) ABSTRACT

A device for retaining a functional part, for example, a roof handle, in a vehicle is provided that includes a retaining element to which the functional part can be indirectly or directly fixed. The retaining element has at least one retaining element-side hinge region around which a retaining element portion can be folded and/or pivoted relative to a further retaining element portion when a pressure force acts substantially toward the retaining element. The at least one hinge region, as viewed in cross-section, can be formed by a retaining element profile section projecting from the retaining element plane, which section, when a pressure force acts on the retaining element folds open or closed about a folding axis and/or a pivot axis formed on the profile section side.

23 Claims, 4 Drawing Sheets

DEVICE FOR RETAINING A FUNCTIONAL PART, IN PARTICULAR A ROOF HANDLE, IN A VEHICLE

This nonprovisional application is a continuation of International Application No. PCT/EP2010/007474, which was filed on Dec. 9, 2010, and which claims priority to German Patent Application No. DE 10 2009 057 833.1, which was filed in Germany on Dec. 10, 2009, and which are both herein incorporated by reference.

BACKGROUND OF THE INVENTION

1. Field of the Invention

The invention relates to a device for retaining a functional part, for example, a roof grab handle, in a vehicle.

2. Description of the Background Art

This type of device for retaining, for example, a roof grab handle as a functional part is generally known. For example, German Offenlegungsschrift DE 103 58 118 A1 discloses a multipart holding component for a roof grab handle, which is attached to a vehicle body and has an approximately L-shaped basic form. One of the L-legs in this case extends approximately horizontal in the mounted basic state. The roof grab handle is mounted on this L-leg. With the application of a pressure force acting towards the roof handle or the holding component, as is the case, for example, in a head impact of a vehicle passenger, the L-leg bearing the roof handle is displaced upward, whereby this L-leg pivots upward around a pivot axis formed in the transitional area between a horizontal L-leg and a vertical L-leg.

German Offenlegungsschrift DE 10 2005 033 080 A1 discloses further a structure of a retaining part for a roof handle, which is formed as a single piece and has two tension plates and a pressure plate. The two tension plates are arranged spaced apart at the retaining part, whereby the pressure plate is arranged between the two tension plates. The two tension plates in the mounted state are slipped or inserted in wall recesses on the vehicle body side, so that these engage behind the respective associated wall recess edge region. In such an inserted state of the retaining part, the pressure plate is in an abutment joint from outside on the vehicle body. The tension plates and the pressure plates are dimensioned here so that the pressure plate in the mounted state under pretension abuts the vehicle interior wall. For the final fixation, further fixing screws are provided by means of which the retaining part is screwed in addition to the vehicle body. In the case of a tensile force load, which is applied, for example, via the roof grab handle to the body, the retaining part can be supported via the tension plates on the vehicle body. When a pressure force is applied in the opposite direction, the retaining part, in contrast, is displaced toward the vehicle interior wall, whereby here then the pressure plate deforms with energy absorption.

German Utility Model No. DE 295 17 468 U1 also discloses a handle arrangement, in which a roof handle is formed movable against the action of an elastic spring. The spring device, in contrast, is stopped when a tensile load acts on the handle.

German Offenlegungsschrift DE 10 2005 053 647 A1 discloses a fixing device for a coat hook as a functional part in the interior of a vehicle, in which between a base plate of the coat hook and the vehicle body an intermediate part is provided, which has deformable or collapsible ribs, which upon application of a pressure force deform or collapse toward the coat hook as the functional part and thereby enable a displacement of the functional part.

SUMMARY OF THE INVENTION

It is therefore an object of the present invention to provide a device for retaining a functional part, in particular a roof grab handle, in a vehicle, which is formed in a simple way in terms of production and manufacturing technology and/or which has a deformation behavior, variably suitable for the most diverse applications and defined upon application of a pressure force.

In an embodiment, a device for retaining a functional part, in particular a roof grab handle, in a vehicle is provided, the device has a retaining element to which the functional part can be fixed directly or indirectly, whereby the retaining element on the retaining element side has at least one hinge region, around which a retaining element portion, when a pressure force is applied acting substantially toward the retaining element, can be folded and/or pivoted relative to another retaining element portion, particularly one to which pressure is not applied or is less applied. According to an embodiment of the invention, the at least one hinge region, as viewed in cross section, is formed by a retaining element profile section, which projects from the retaining element plane and which when a pressure force is applied to the retaining element folds open or closed around a folding and/or pivot axis formed on the profile section side. This type of retaining element profile section, projecting from the retaining element plane, outward curving, or formed or folded out of the retaining element plane, enables a defined hinge formation which, depending on the specific installation situations, can be provided at the most diverse retaining element positions. In contrast to conventional retaining elements, which can be bent only around angled retaining element regions, the structural degree of freedom therefore increases considerably with the solution according to the invention. By means of the retaining element profile section projecting or protruding from the retaining element plane, on the one hand, an especially simple and defined, as well as functionally reliable, pivoting of a retaining element portion relative to another retaining element portion can thus be achieved, whereby simultaneously the retaining element profile section, as will be described in greater detail below, can also be designed in a simple manner so that when a tensile force is applied opposite to the pressure force it does not fold open or closed.

According to an embodiment, the retaining element profile section, as viewed in cross section, can be formed U- or V-shaped, whereby the profile section leg regions, protruding from the retaining element, either abut one another in an abutment joint or are separated from one another at least in areas by a profile section gap. This type of leg abutment joint can be provided especially for cases in which the retaining element profile section is to fold open upon application of a pressure force. For those cases in which the retaining element profile section is to fold closed, in contrast, a suitable profile section gap is then to be provided which defines a folding or pivoting path. A profile section gap can, of course, also be provided in those embodiments in which the retaining element profile section is to fold open upon application of a pressure force. The leg regions of the profile section in this case, depending on the design, can be made of the same or different length. Alternatively or in addition to this, the profile section leg regions, for example, can project perpendicular or substantially perpendicular from the retaining element plane or also, however, can be inclined at an angle to the retaining element plane. The respective specific embodiment arises through the respective specific installation situation. This type of retaining element profile section, formed U- or V-shaped in cross section, can be produced in a simple manner in terms of production and manufacturing technology, for example, in the case of a sheet metal construction by simple folding, bending, or deep drawing of the appropriate sheet metal region. In the case of a plastic construction, for example, such a retaining element profile section can also be produced simply, for example, by injection molding. In an embodiment, the folding and/or pivot axis can be formed in the area of the U- or V-base. In this case, no additional measures, such as, for example, defined material weakening or the like, are then necessary to form in the retaining element profile section a defined folding and/or pivot axis, which, however, can be basically provided if necessary.

According to an embodiment, the at least one retaining element profile section in the basic mounted state can protrude substantially upward, in the vehicle vertical axis direction. In this respect, the retaining element portion, connected directly or indirectly to the functional part, upon application of a pressure force is displaceable upward into a free space on the vehicle body side with the folding open or swinging open of the retaining element profile section. It can be provided alternatively, particularly in conjunction with an approximately horizontally extending retaining element in the mounted state, that the at least one retaining element profile section, with a U- or V-shaped cross section, protrudes downward in the vehicle vertical axis direction, whereby a profile section gap defining a pivoting or folding path is formed between the profile section leg regions. As a result, the retaining element portion, directly or indirectly connected to the functional part, upon application of a pressure force, with the folding closed of the retaining element profile section can be displaced upward into a free space on the vehicle side. The two previously described embodiments, depending on the individual conditions, can be used and enable an especially functionally reliable swinging open or folding closed of the retaining element profile section upon application of a pressure force with simultaneous energy absorption.

According to another embodiment, it is provided that, as viewed in cross section, a support element, bracing the transitional region upon the application of a tensile or pressure force, is arranged and/or configured in at least one transitional region, on the outside of the profile section, between the retaining element profile section and the retaining element region adjacent thereto and/or between retaining element sections, extending at an angle to one another. The support element can be configured, for example, as an embossing or a bead-like design. With a support element of this type, it can be assured in a simple manner that upon application of a pressure force folding occurs around the retaining element profile section and not optionally in addition or alternatively in possible other bending or radial or transitional regions between retaining element sections arranged at an angle to one another. In this regard, it has proven especially advantageous that, as viewed in the profile section longitudinal extension direction, a majority of spaced apart support elements can be arranged and/or configured in the predefined transitional regions. In the case of the retaining element profile section, it has proven especially advantageous to arrange the support elements on both sides of the profile section, optionally offset to one another in the profile section longitudinal extension direction.

According to an embodiment of the present invention, it is provided that the retaining element can be made of the same material and as a single piece, for example, from a sheet metal material. This type of single-piece retaining element structure is especially simple and inexpensive in terms of manufacturing and production technology.

Furthermore, it is especially advantageous, particularly in conjunction with a retaining element profile section that folds open, when in the profile section gap at least one leg-side stop element, preferably formed like a strip or nib or extension and/or particularly by a local embossment, is arranged or configured, which upon application of a defined tensile force, substantially directed away from the retaining element, in an abutment joint abuts the other profile section leg or a leg-side counterstop element, arranged or configured there, and which releases the folding open or swinging open of the retaining element profile section upon the application of a pressure force. Such stop elements upon application of a tensile force therefore enable an advantageous blocking of the hinge region, formed by the retaining element profile section, and assure that the retaining element profile section folds open only upon application of a defined pressure force. The retaining element profile section thereby during application of a tensile force does not represent a material weakness, which has a negative effect on the flexibility of the retaining element during application of a tensile force.

The retaining element in this regard, as viewed in cross section, may have a first retaining element section, which extends approximately horizontally in the mounted state and to which, as viewed in cross section, a lateral retaining element section, protruding at an angle therefrom, attaches to at least one side for fixing the functional part to the retaining element and/or for fixing the retaining element to the vehicle body. Overall, a Z-shaped retaining element structure especially is advantageous, whereby it is preferably provided further that at least one retaining element profile section can be arranged in the first retaining element section. This type of structure enables a fixing to a lateral vehicle body, for example, in the roof edge region or to a side wall region or a fastening of a roof grab handle, for example, as a functional element in conjunction with a horizontal retaining element section, having at least one retaining element profile section, as a result of which a structure is provided in which the retaining element part, acted upon by a pressure force, can pivot in a defined and especially functionally reliable manner into the free space on the vehicle side. Especially in conjunction with a retaining element design of this type, in which single or a plurality of retaining element sections protrude at an angle, the previously described embodiment of the transitional regions with support elements, which brace the transitional regions during application of a tensile and/or pressure force, is of particular advantage.

According to an embodiment of the present inventive concept, it is provided that the retaining element is configured as having many parts with a partition plane in the area of the retaining element profile section, so that a first profile section portion, particularly a first profile section leg region, of a first retaining element part is fixedly connectable to a second profile section portion, particularly to a second profile section leg region, of a second retaining element. The connection can be made, for example, by bonding, for example, by a weld connection. This type of multipart retaining element structure is in fact more expensive to produce than a retaining element made as a single piece, but it enables greater structural degrees of freedom, especially in conjunction with the very closely adjacent or integral design of profile section support regions, which act during application of a pressure force, on the one hand, and the profile section folding regions, which act during application of a pressure force, on the other, as will be described in greater detail below.

For example, the at least one retaining element profile section, as viewed in the profile section longitudinal extension direction, can be formed at least in areas so that upon application of a defined tensile force, substantially directed away from the retaining element, a first profile section region in a profile section support region is supported by a second profile section region. As a result, for example, in conjunction with a U- or V-shaped profile section design with a profile section gap between the profile section leg regions, in an advantageous dual function a profile section region can be configured that folds closed to a desired degree upon application of a pressure force and is supporting upon application of a tensile force action.

According to an embodiment, it is provided that the functional part is connected directly or indirectly to the first retaining element part, whereby the first retaining element part further has the first profile section region, which is supported by a part of the second profile section region forming the second retaining element region. The first retaining element part in this case can have at least in the support region a smaller wall or material thickness than the second retaining element part. Alternatively or in addition to this, the second retaining element part can be fixed directly or indirectly to the vehicle body, for example, attached by means of a weld screw or the like. Because the second retaining element part has a greater wall or material thickness at least in the support region than the first retaining element part, a functionally reliable support in the profile section support region is possible. Because of the smaller wall or material thickness of the first retaining element part, however, at the same time the folding and thereby the energy absorption are also favorably affected. Further, the greater wall or material thickness of the second retaining element part also results in an especially stable connection to the vehicle body.

According to another embodiment, it is provided to this end that the retaining element, as viewed in the profile section longitudinal extension direction, has at least one section in which a profile section support region is formed, whereby it is preferably provided that the retaining element has an approximately central material recess to which, as viewed in the profile section longitudinal extension direction, on both sides a retaining element profile section with at least one retaining element support region, extending over at least one portion, is attached. This type of structure with a material recess is relatively cost-effective and inexpensive in its production. In addition, as a result on both sides of the material recess, as viewed in the profile section longitudinal extension direction, preferred spaced apart profile section regions configured mirror symmetric are formed, which upon application of a pressure force form an especially favorable hinge and joint function for a functionally reliable folding open or closed.

In conjunction with the multipart structure of the retaining element, it has proven especially favorable and advantageous in terms of functional technology that the retaining element profile section in the area outside the profile section support region is formed by a U-shaped or V-shaped bent tab, which is configured at the first retaining element part and is connected to an angled, edge-side leg of the second retaining element part. This connection occurs particularly by means of a flat abutment joint and by bonding, for example, by welding. Such tabs have the particular advantage that they can be bent in the profile section support region upward and can engage behind or under with an edge region of the leg, so that different profile section support regions or folding regions can be formed with relatively simple measures.

For additional support, it can be provided further that a support plate is connected, particularly welded, to the retaining element profile section, said plate which extends in the mounted state in the vehicle vertical axis direction or downward inclined against the vehicle vertical axis direction, preferably into a free space between a head airbag and a roof liner. To this end, the support plate preferably has at least one leg, which is connected in the profile section support region, for example, is connected by bonding in a flat abutment joint. An additional bracing of the profile section support region can be achieved with such a support plate.

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
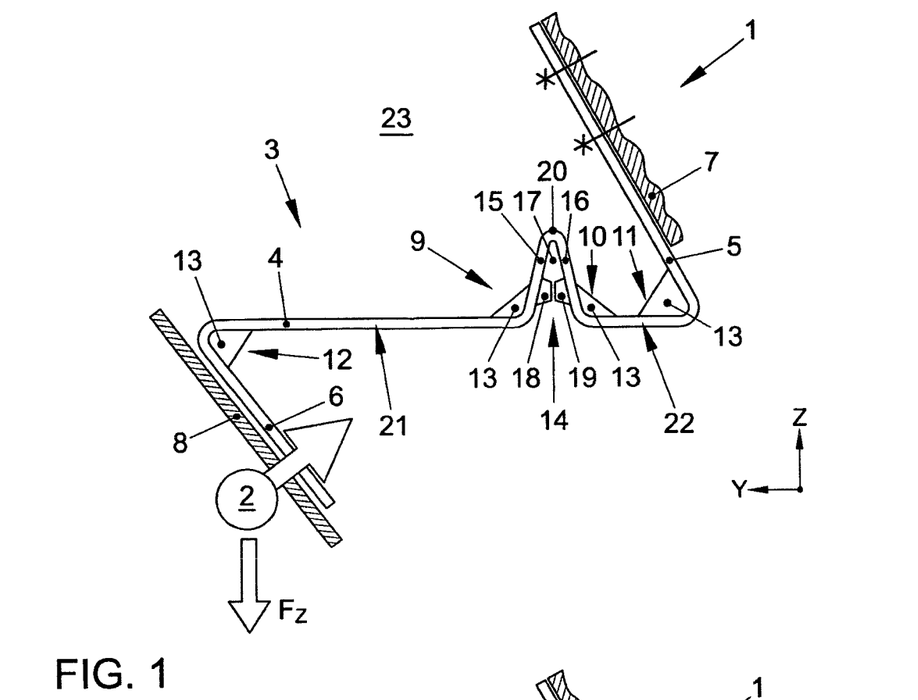
FIG. 1 shows schematically a cross section through an embodiment of a device for retaining a roof grab handle here as a functional part.

A cross section through an embodiment of a device 1 of the invention for retaining a roof grab handle 2 in a vehicle is shown schematically in FIG. 1. Device 1 has a plate-shaped retaining element 3, which has a first retaining element section 4 approximately horizontal in the mounted state, at each end side of which an angled retaining element section as a second retaining element section 5 and third retaining element section 6 is attached, so that retaining element 3 is formed approximately Z-shaped.

Second retaining element section 5 in this regard is attached, for example, by means of fastening screws or weld screws to a side part 7 of the vehicle body, which is otherwise not shown here. Third retaining element section 6, which is angled downward here, in other words, in the negative vehicle vertical axis direction Z, is substantially parallel here or in an abutment joint to a headliner 8. Further, roof grab handle 2, which is shown here only very schematically, is attached to this third retaining element section. The vehicle transverse axis direction is defined here by Y.

As can be derived further from FIG. 1, in the two transitional regions 9, 10 on the outside of the profile section, and in the transitional regions 11, 12 between retaining element sections 4, 5, and 6, which are angled to one another, a support element 13, formed, for example, by a bead as a local embossment, is provided whose function will be discussed in greater detail below.

Further, a retaining element profile section 14 is configured, projecting upward from the retaining element plane in the vehicle vertical axis direction in the first retaining element section; the profile section in the cross section regarded here is configured substantially U-shaped, whereby the two profile section leg regions 15, 16 are separated from one another by a profile section gap 17. In this profile section gap 17 at each leg, stop elements 18, 19 are constructed which, for example, are configured by a local embossment and which in the mounted basic position shown here are adjacent to one another.

Stop elements 18, 19 and/or support elements 13 extend here in the longitudinal extension direction of profile section 14 or of retaining element 3 to a predefined extent, said longitudinal direction directed into the plane of the figure, whereby it is preferably provided that in this longitudinal extension direction a plurality of stop elements 18, 19 or support elements 13 are provided having a defined distance from one another. Of course, it is also possible to form stop elements 18, 19 and/or support elements 13 as continuous in the longitudinal extension direction, in other words, without interruptions.

In the application of the tensile force, shown in FIG. 1 by the force arrow $F_z$ and applied, for example, via roof grab handle 2, support elements 13 bring about a bracing of transitional regions 9, 10, 11, and 12 and stop elements 18, 19 go solid in gap 17 of profile section 14, so that an overall firmer retaining element structure is provided, which can absorb relatively high tensile forces.

Figure 2:
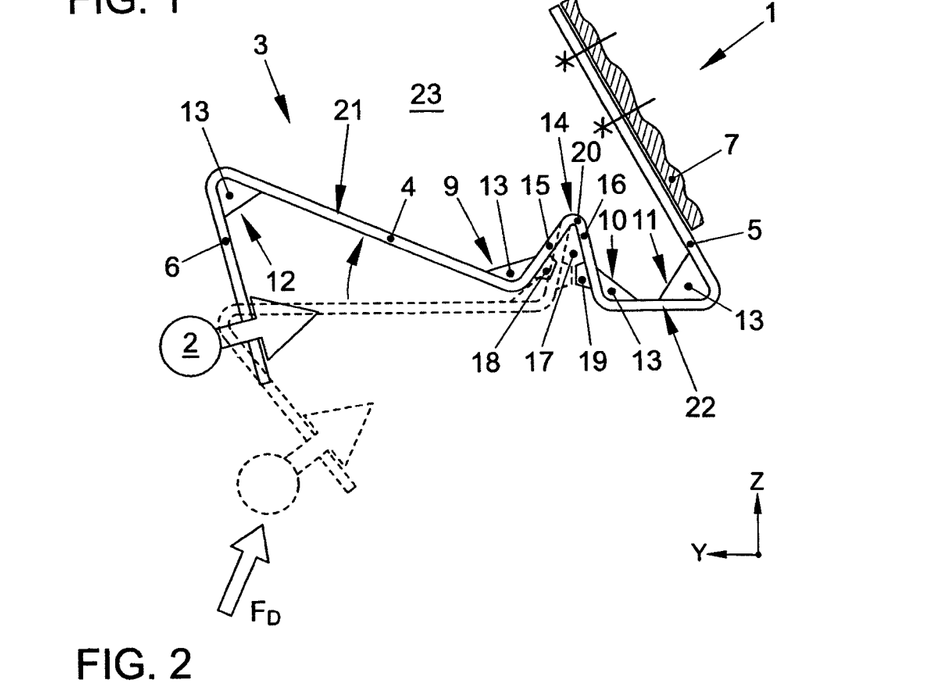
FIG. 2 shows a structure according to FIG. 1 upon application of a pressure force.

In a pressure force application $F_D$, acting substantially toward roof grab handle 2, as shown in FIG. 2, support elements 13 also cause a bracing of transitional regions 9, 10, 11, and 12, whereby, however, profile section 14 then forms a hinge here, which in the area of the U-base provides a folding axis 20, around which a retaining element portion 21, bearing roof grab handle 2, is folded or pivoted relative to a retaining element portion 22. Retaining element portion 21 pivots thereby upward with absorption of energy into a free space 23 on the vehicle body side.

It is to be understood that profile section 14 is shown here only by way of example and schematically. Of course, profile section 14, for example, based on the figure plane of FIGS. 1 and 2, can also be arranged further left or leg regions 15, 16 can be configured different in length or inclined. The presently shown schematic embodiment serves only for the exemplary explanation of the present inventive concept.

In FIG. 2, further, to clarify the displacement of retaining element portion 21, the basic position of retaining element portion 21, as shown in FIG. 1, is drawn in with dashed lines. Further, the headliner is not shown here for the sake of clarity.

Figure 3:
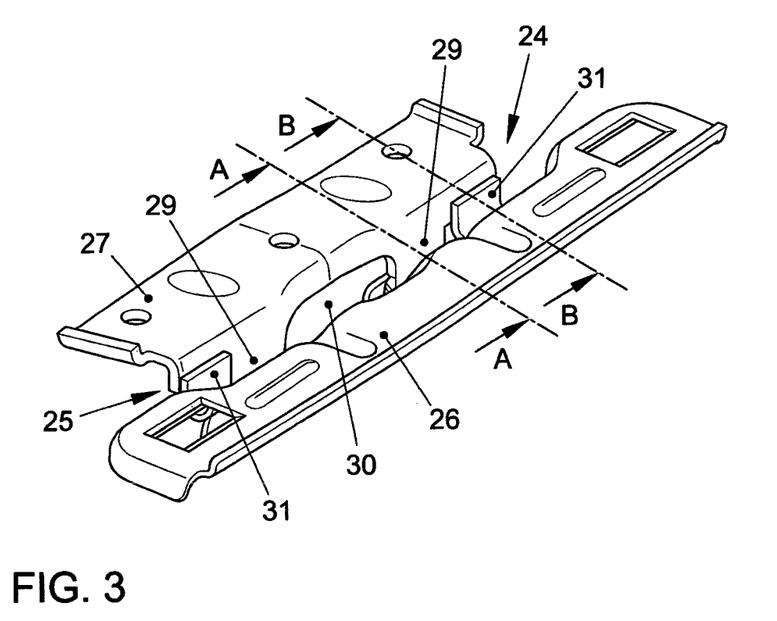
FIG. 3 shows schematically a perspective plan view of a retaining element of an embodiment of a device for retaining, for example, a roof grab handle as a functional part.
Figure 4:
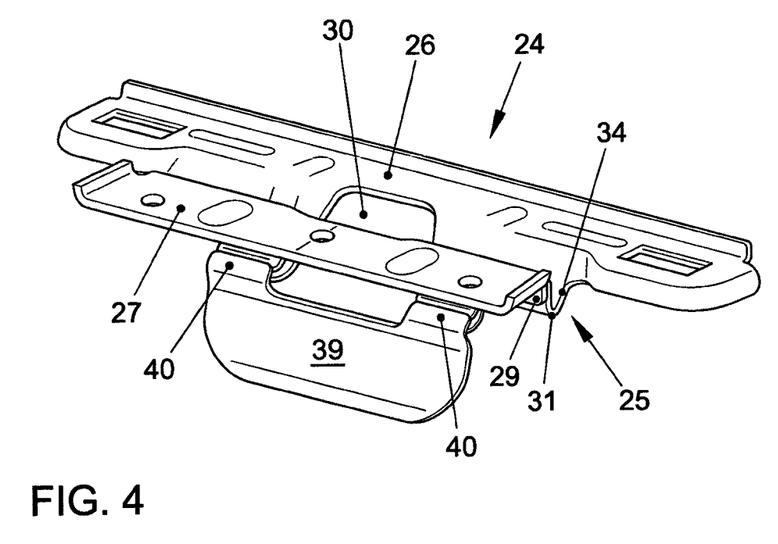
FIG. 4 shows a view, rotated about 180°, of the retaining element according to FIG. 3 with an optional support plate.

In FIGS. 3 to 6, now a second alternative embodiment of device 1 of the invention for retaining a roof grab handle 2 is shown by way of example. In this regard, FIGS. 3 and 4 show different perspective plan views of a retaining element 24, which, in contrast to retaining element 3 of the embodiment according to FIGS. 1 and 2, is not configured as a single piece but of many parts, namely, in particular with a partition plane in the area of a retaining element profile section 25, especially evident from FIGS. 5 and 6. As is evident from the overview of FIGS. 3 to 6, retaining element 24 has a first retaining element part 26, which preferably has a smaller material thickness or wall thickness than second retaining element part 27 connected thereby, for example, by welding.

Figure 5A:
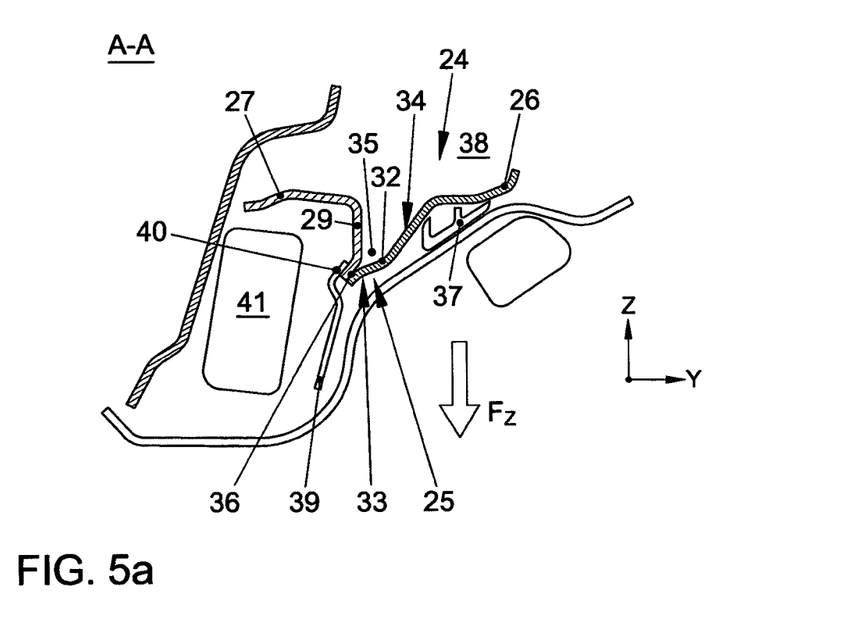
FIG. 5a shows schematically a longitudinal section along the line A-A of FIG. 3 in the mounted state of the retaining element.
Figure 5B:
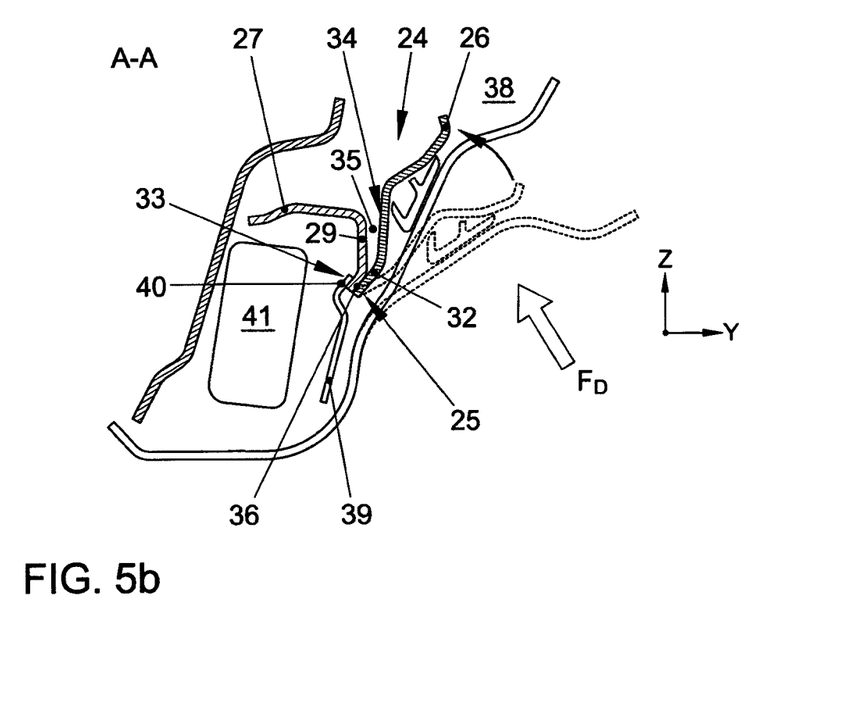
FIG. 5b shows a view according to FIG. 5a upon application of a pressure force.
Figure 6A:
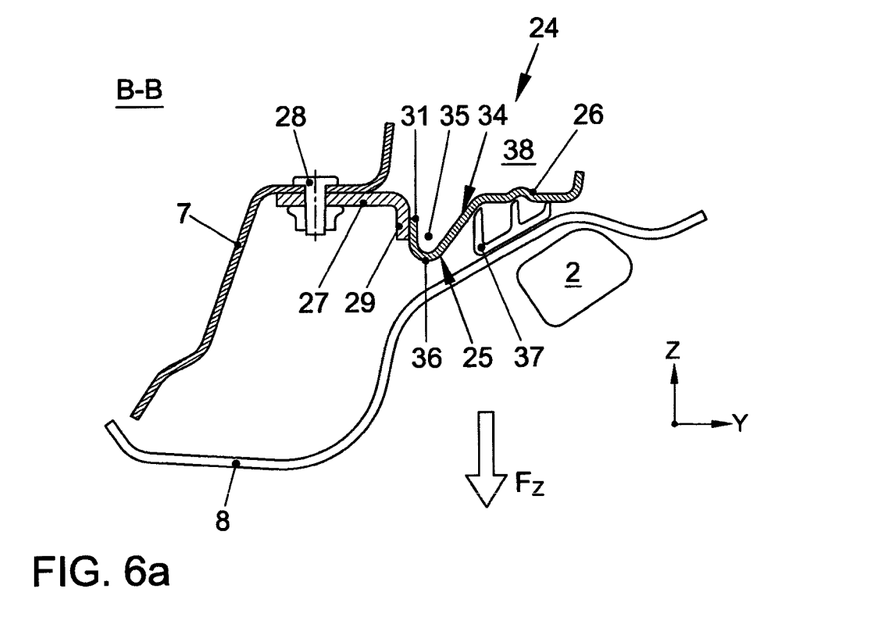
FIG. 6a shows schematically a longitudinal section along the line B-B of FIG. 3 in the mounted state of the retaining element.
Figure 6B:
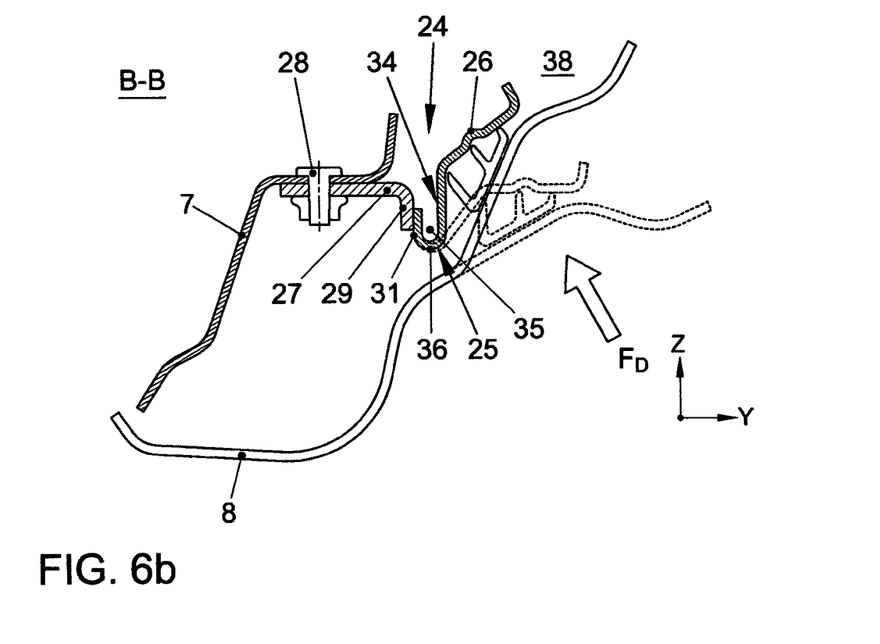
FIG. 6b shows a view according to FIG. 6a upon application of a pressure force.

This second retaining element part 27 is, for example, attached by means of a weld screw 28 to a side part 7 of the vehicle body and here has an edge-side leg 29, angled substantially downward into the figure plane of FIGS. 5 and 6, in the negative vehicle vertical axis direction Z.

As is particularly evident from FIGS. 3 and 4, retaining element 24 in a middle area has a material recess 30, which merges from first retaining element part 26 to second retaining element part 27 or vice versa, so that in the connection area of the two retaining element parts 26, 27 an approximately fork-like structure results; i.e., second retaining element 27 has, for example, two legs 29 on both sides of material recess 30, which are connected to first retaining element part 26 in a manner described in greater detail below.

As FIG. 6a, which shows a section along the line B-B of FIG. 3, clarifies, first retaining element part 26 in the connection area to second retaining element part 27 has a U-shaped, bent tab 31, which with an outer side of the tab lies flat in a flat abutment joint against the associated leg region of leg 29 and is connected to it, for example, by means of a weld joint.

In the area of the section along line A-A of FIG. 3, tab 31, as shown in FIG. 5a, in contrast, is bent downward and, in so doing, engages the free end of leg 29 beneath and behind, which is slightly shortened inwardly in this area, to enable a flat abutment joint in the bottom or rear engagement area of bent tab 32, whereby here as well preferably a weld connection between leg 29 and bent tab 32 is provided.

As is particularly evident from FIGS. 3 and 4, a profile section support region 33 with bent tab 32, as shown in FIGS. 5a and 5b, first attaches to both sides of material recess 30 of retaining element 24, thus in a mirror symmetrical manner, said region to which the profile section region, shown in FIGS. 6a and 6b, with unbent tab 31 attaches directly.

Leg 29 together with U-shaped tab 31 and bent tab 32 therefore forms a profile section 25 here, which protrudes substantially downward in the negative vehicle vertical axis direction Z from the retaining element plane and which again has an approximately V- or U-shaped cross-sectional shape, whereby leg regions 29, 34 of this profile section 25 again enclose a defined gap 35 between them. Here as well, the V- or U-base forms a folding axis 36.

Roof grab handle 2, which is not shown here in detail, is connected further to first retaining element part 26. Furthermore, here first retaining element part 26 is supported, for example, via an adapter element 37 by headliner 8.

The mode of operation of this second embodiment variant will be described in greater detail below with use of FIGS. 5 and 6.

As is evident particularly from FIG. 5a, upon application of a tensile force in the direction of the force arrow $F_Z$, first retaining element part 26 with bent tab 32, engaging below and/or behind leg 29 of second retaining element part 27, is supported on this very leg 29, so that thereby an overall more rigid retaining element structure 24 is provided. Upon application of a pressure force in the direction of the force arrow $F_D$, in contrast, as shown schematically in FIGS. 5b and 6b, first retaining element part 26 folds around folding axis 36 upward into a free space 38, whereby profile element support region 33 does not impede or interfere with this folding.

Optionally, as is evident particularly from FIGS. 4 and 5, a support plate 39 can also be connected to the retaining element structure, said plate which in the area of its connection to second retaining element part 27 is configured U-shaped with support plate legs 40 and in the mounted state extends downward into the free space between headliner 8 and a head airbag 41. This optional support plate 39 has an energy-absorbing function during application of a pressure force.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for retaining a functional part in a vehicle, the device comprising:
   a retaining element to which the functional part is fixed directly or indirectly, the retaining element comprising:
   a retaining element side;
   a plurality of retaining element portions; and
   at least one hinge region on the retaining element side, wherein when a pressure force is applied acting substantially toward the retaining element, a first of the retaining element portions is configured to be foldable or pivotable around the at least one hinge region relative to a second of the retaining element portions; and
   a retaining element profile section forming the at least one hinge region, as viewed in cross section, the retaining element profile section projecting from a retaining element plane,
   wherein, when the pressure force is applied to the retaining element, the retaining element profile section folds or pivots around an axis, and
   wherein the second of the retaining element portions comprises a fixed member.

2. The device according to claim 1, wherein the retaining element profile section, as viewed in cross section, is configured U- or V-shaped and profile section leg regions, protruding from the retaining element, abut one another in an abutment joint or are separated from one another at least in areas by a profile section gap.

3. The device according to claim 2, wherein the folding or pivot axis is configured in the area of the retaining element profile section.

4. The device according to claim 1, wherein the at least one retaining element profile section in a basic mounted state protrudes substantially upward, in a vehicle vertical axis direction.

5. The device according to claim 2, wherein the at least one retaining element profile section, which is configured to be U- or V-shaped in cross section, protrudes downward in a vehicle vertical axis direction, wherein a profile section gap, defining a pivoting or folding path, is configured between the profile section leg regions.

6. The device according to claim 2, wherein, as viewed in cross section, a support element bracing the transitional region upon application of a pressure force and/or tensile force, particularly an embossment or a bead, is arranged and/or is configured in at least one transitional region, on an outside of the profile section, between the retaining element profile section and the retaining element region adjacent thereto and/or between retaining element sections, extending at an angle to another, wherein, as viewed in a profile section longitudinal extension direction, a majority of spaced apart support elements are arranged and/or configured in predefined transitional regions and/or relative to the retaining element profile section support elements are arranged on both sides of the profile section offset to one another in the profile section longitudinal extension direction.

7. The device according to claim 2, wherein, in the profile section gap, at least one leg-side stop element configured as a strip or nib or extension and/or a local embossment, is arranged or formed, which upon application of a defined tensile force, substantially directed away from the retaining element in an abutment joint abuts the other profile section leg or a leg-side counterstop element arranged or configured there and releases the folding open or swinging open of the retaining element profile section upon application of a pressure force.

8. The device according to claim 1, wherein the retaining element, as viewed in cross section, has a first retaining element section, which extends approximately horizontally in the mounted state and to which, as viewed in cross section, a lateral retaining element section protruding at an angle therefrom attaches to at least one side for fixing the functional part to the retaining element and/or for fixing the retaining element to the vehicle body, and wherein at least one retaining element profile section is arranged in the first retaining element section.

9. The device according to claim 1, wherein the retaining element is made of the same material and as a single piece or wherein the retaining element is made from a sheet metal material.

10. A device for retaining a functional part in a vehicle, the device comprising:
    a retaining element to which the functional part is fixed directly or indirectly, the retaining element comprising:
    a retaining element side;
    a plurality of retaining element portions; and
    at least one hinge region on the retaining element side, wherein when a pressure force is applied acting substantially toward the retaining element, a first of the retaining element portions is configured to be foldable or pivotable around the at least one hinge region relative to another of the retaining element portions; and
    a retaining element profile section forming the at least one hinge region, as viewed in cross section, the retaining element profile section projecting from a retaining element plane,
    wherein, when the pressure force is applied to the retaining element, the retaining element profile section folds or pivots around an axis, and
    wherein the retaining element is configured as having many parts with a partition plane in the area of the retaining element profile section so that a first profile section portion of a first retaining element part is fixedly connectable to a second profile section portion of a second retaining element, by bonding or a weld connection.

11. The device according to claim 1, wherein the retaining element profile section, as viewed in a profile section longitudinal extension direction, is configured at least in areas so that upon application of a defined tensile force, substantially directed away from the retaining element, a first profile section region in a profile section support region is supported by a second profile section region.

12. The device according to claim 11, wherein the functional element is connectable directly or indirectly to the first of the retaining element portions, and wherein the first of the retaining element portions further has the first profile section region, which is supported by a part of the second profile section region forming the second of the retaining element portions.

13. The device according to claim 12, wherein the first of the retaining element portions at least in the support region has a smaller wall or material thickness than the second of the retaining element portions, and/or wherein the second of the retaining element portions is fixed directly or indirectly to the vehicle body, by a weld screw.

14. The device according to claim 11, wherein the retaining element, as viewed in the profile section longitudinal extension direction, has at least one section in which the profile section support region is configured, wherein the retaining element has an approximately central material recess to which as viewed in the profile section longitudinal extension direction, on both sides a retaining element profile section with at least one profile section support region extending over at least one portion, is attached.

15. The device according to claim 11, wherein the retaining element profile section in an area outside the profile section support region is formed by a U-shaped or V-shaped bent tab, which is arranged at the first of the retaining element portions and is connected to an angled, edge-side leg of the second of the retaining element portions and abuts there in a flat abutment joint and is connected by bonding thereto.

16. The device according to claim 15, wherein the tab is bent upward in the profile section support region and engages behind or under with an edge region of the leg.

17. A device for retaining a functional part in a vehicle, the device comprising:
 a retaining element to which the functional part is fixed directly or indirectly, the retaining element comprising:
  a retaining element side;
  a plurality of retaining element portions; and
  at least one hinge region on the retaining element side, wherein when a pressure force is applied acting substantially toward the retaining element, a first of the retaining element portions is configured to be foldable or pivotable around the at least one hinge region relative to another of the retaining element portions; and
 a retaining element profile section forming the at least one hinge region, as viewed in cross section, the retaining element profile section projecting from a retaining element plane,
 wherein, when the pressure force is applied to the retaining element, the retaining element profile section folds or pivots around an axis,
 wherein the retaining element profile section, as viewed in cross section, is configured U- or V-shaped and profile section leg regions, protruding from the retaining element, abut one another in an abutment joint or are separated from one another at least in areas by a profile section gap,
 wherein the at least one retaining element profile section, which is configured to be U- or V-shaped in cross section, protrudes downward in a vehicle vertical axis direction, wherein a profile section gap, defining a pivoting or folding path, is configured between the profile section leg regions, and wherein the plurality of retaining element portions, directly or indirectly connected to the functional part, upon application of a pressure force, is configured to be displacable upward, as viewed in the vehicle vertical axis direction, into a free space on a vehicle body side, and
 wherein a support plate is connected or welded to the retaining element profile section, said plate which extends in a mounted state in the vehicle vertical axis direction or downward inclined against the vehicle vertical axis direction into a free space between a head airbag and a roof liner.

18. The device according to claim 17, wherein the support plate has at least one leg, which is connectable in the profile section support region or connectable to the second profile section region via bonding in a flat abutment joint.

19. The device according to claim 1, wherein the functional part is a roof grab handle.

20. A device for retaining a functional part in a vehicle, the device comprising:
 a retaining element to which the functional part is fixed, the retaining element comprising:
  a first retaining element portion;
  a second retaining element portion;
  a least one hinge region disposed between the first retaining portion and the second retaining portion,
  wherein when a pressure force is applied acting substantially toward the retaining element, the first retaining element portion is configured to be foldable or pivotable around the at least one hinge region relative to the second retaining element portion, the hinge portion projecting from a plane of the retaining element, and
  wherein the second retaining element portion comprises a fixed member.

21. A retaining element, comprising:
 a first retaining element portion;
 a second retaining element portion;
 a least one hinge region disposed between the first retaining portion and the second retaining portion,
 wherein when a pressure force is applied acting substantially toward the retaining element, the first retaining element portion is configured to be foldable or pivotable around the at least one hinge region relative to the second retaining element portion, the hinge portion projecting from a plane of the retaining element, and
 wherein the second retaining element portion comprises a fixed member.

22. The retaining element according to claim 21, wherein as the first retaining element portion is folded or pivoted around the at least one hinge region, the second retaining element portion is configured to remain in a fixed position.

23. The retaining element according to claim 21, wherein the first retaining element portion comprises a first end and the second retaining element portion comprises a first end connected to the first end of the first retaining element portion at a connection point, and
 wherein the first retaining element portion is configured to be pivotable or foldable about the connection point.

* * * * *